United States Patent [19]
Martindale et al.

[11] Patent Number: 5,370,436
[45] Date of Patent: Dec. 6, 1994

[54] DUAL COMPOSITION BED LINER

[76] Inventors: Gerald A. Martindale, 2668 N. Bird, Boise, Id. 83704; Lonnie D. Kuenzli, 755 Palmer, Eagle, Id. 83616

[21] Appl. No.: 50,674

[22] Filed: Apr. 21, 1993

[51] Int. Cl.⁵ .............................................. B60R 13/01
[52] U.S. Cl. .................................................. 296/39.2
[58] Field of Search ............................ 296/39.2, 39.1

[56] References Cited

U.S. PATENT DOCUMENTS

| | | | |
|---|---|---|---|
| 4,162,098 | 7/1979 | Richardson, III | 296/39.2 |
| 4,336,963 | 6/1982 | Nix et al. | 296/39 R |
| 4,752,097 | 6/1988 | Van Kirk et al. | 296/39 R |
| 4,944,612 | 7/1990 | Abstetar et al. | 296/39.2 |
| 5,137,322 | 8/1992 | Muirhead | 296/39.2 |
| 5,165,747 | 11/1992 | Stringler et al. | 296/39.2 |

Primary Examiner—Robert R. Song
Attorney, Agent, or Firm—Frank J. Dykas; Craig M. Korfanta

[57] ABSTRACT

A dual composition bed liner (10) is disclosed which includes a unitary side and front wall member (11) formed of a resilient plastic, such as polyethylene, and which has a rubber bed mat (18) integrally attached to the unitary wall member (11). A plurality of "C" shaped retaining tabs (19) are formed along the upper edge of unitary wall member (11) to engage the underside of truck bed rail (24). Each of the left side (11a), right side (11c) and front wall (11b) panels have a lip (13) extending inwardly from their bottom edges. A mat retaining ridge channel (14) is formed in the underside of the lip (13) to receive a retaining ridge (19) formed along the marginal edge of the upper surface of the bed mat (18). A plurality of rivet recesses (15) are provided in the top and bottom of retaining ridge (19) and are positioned to align with similar rivet recesses (15) in the mat ridge channel (14). Bed mat (18) is attached to unitary wall member (11) using nylon or similar non-marring rivets (16) which are countersunk, on at least the bottom surface, so they will not come in contact with pickup bed (25).

9 Claims, 6 Drawing Sheets

5,370,436

DUAL COMPOSITION BED LINER

BACKGROUND OF THE INVENTION

1. Technical Field

This invention generally relates to liners for the beds of pickup trucks. More particularly, this invention relates to a pickup truck bed liner having integrally formed resilient opposing plastic sidewalls, a front wall and a tailgate cover, which a non-skid bed cushion or matt is integrally attached to the bottom of the two sidewalls and the front wall.

2. Background Art

The current state of the art in truck bed liners is typified by U.S. Pat. No. 4,336,963 to Nix et al. and U.S. Pat. No. 4,752,097 to Van Kirk et al. These patents teach similar integrally formed liners made of polyethylene plastic or a similar material. Each liner has a pair of opposing sidewalls and a front wall formed integrally with the bottom bed panel. A separate tailgate cover is provided which is attached directly to the tailgate of the pickup truck.

One of the primary problems with these liners is that the plastic material has a very low coefficient of friction. While this aids in the loading and unloading of cargo, it frequently results in the cargo sliding around during transit which can result in damage to both the cargo and the truck bed.

At least one attempt has been made to design a pickup bed liner which includes a floor panel having a higher coefficient of friction. Abstetar et al., U.S. Pat. No. 4,944,612, teaches a four piece bed liner having the bottom floor panel manufactured from a combination of polyolefin thermoplastic and reclaimed rubber products. The primary drawback to this invention is that it is in four separate pieces, while a unitary or integral construction, with the bed panel attached, is preferred. Until now, there has been no way to construct a single piece bed liner having resilient plastic sidewalls and a rubber or similar composition floor panel.

Another problem with the traditional plastic single piece molded bed liners is a tendency of the liner to buckle or bubble in the middle of the floor panel as a result of their exposure to sunlight. This buckling causes a separation of the floor panel from the truck bed floor itself which allows debris to be blown under the bed liner due to the air turbulence created by the moving truck. This is such a problem that a number of truck manufacturers specifically exclude the truck bed from the truck warranty if a bed liner is used.

Accordingly, what is needed is a pickup truck bed liner of unitary construction, which includes a non-skid floor panel and which will prevent corrosion to the truck bed due to either contact with plastic or debris.

DISCLOSURE OF INVENTION

This need, and others, are satisfied by a dual composition bed liner which includes a unitary side and front wall member formed of a resilient plastic, such as polyethylene, and which has a rubber bed mat integrally attached to the unitary wall member.

Each of the left side, right side and front wall panels have a lip or flange extending inwardly from their bottom edge. A downwardly facing mat retaining ridge channel is formed in the underside of the lip to receive a retaining ridge formed along the marginal edge of the upper surface of the bed mat. A plurality of rivet recesses are provided in the top and bottom of the retaining ridge and are positioned to align with similar rivet recesses in the mat ridge channel. The bed mat is attached to the unitary wall member using nylon or similar non-marring rivets which are countersunk, on at least the bottom surface, so they will not come in contact with the pickup bed.

A plurality of retaining tabs extend from the top edge of the unitary wall member and are configured to engage the underside of the truck bed rail to secure the liner in position. A separate tailgate cover panel is provided which includes a mat retention lip. The lip is positioned and configured to overlap the rear edge of the bed mat when the tailgate is in its up or closed position. This feature prevents air currents from lifting the back edge of the mat and allowing debris to come between the mat and the pickup bed surface.

BEST MODE FOR CARRYING OUT INVENTION

Figure 1:
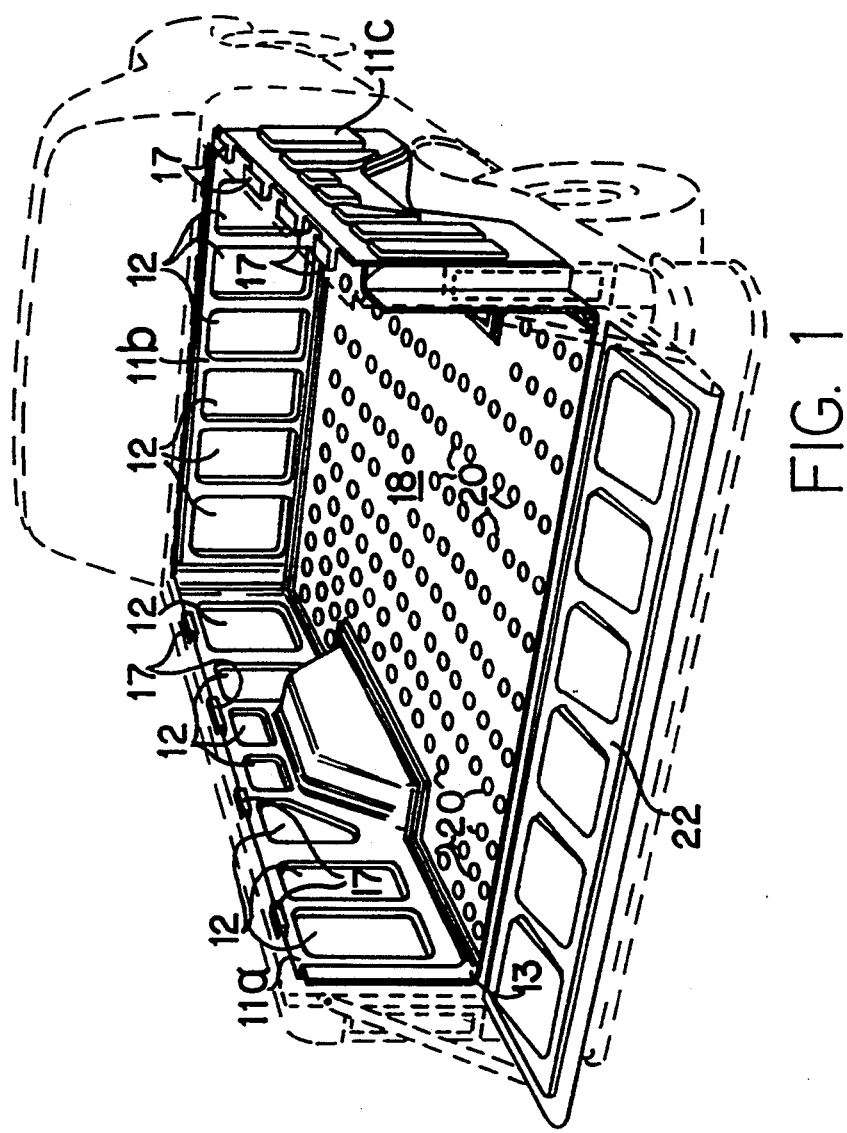
FIG. 1 is a perspective view of the dual composition bed liner installed in a pickup truck.
Figure 2:
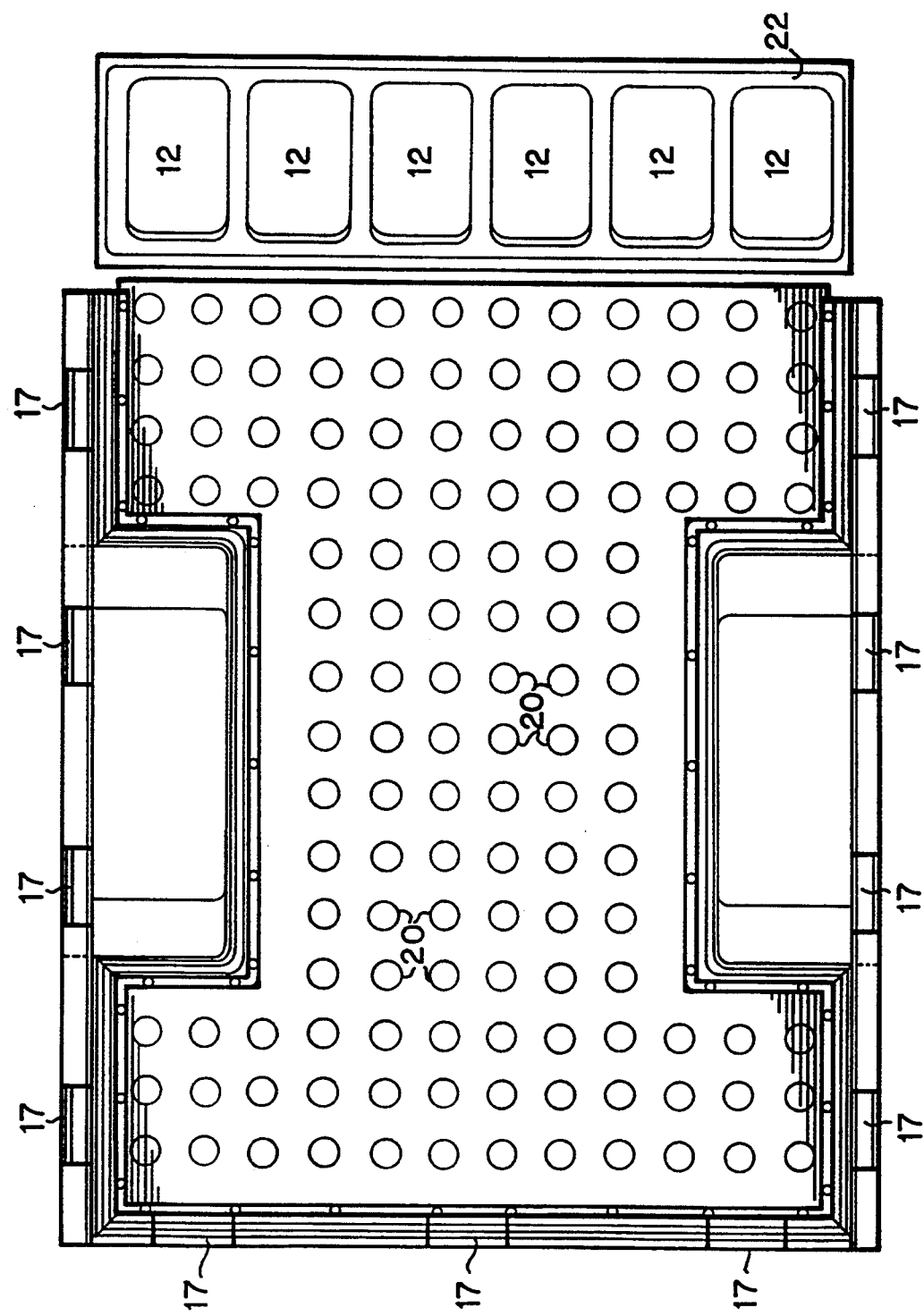
FIG. 2 is a top view of the dual composition bed liner and tailgate cover.
Figure 3:
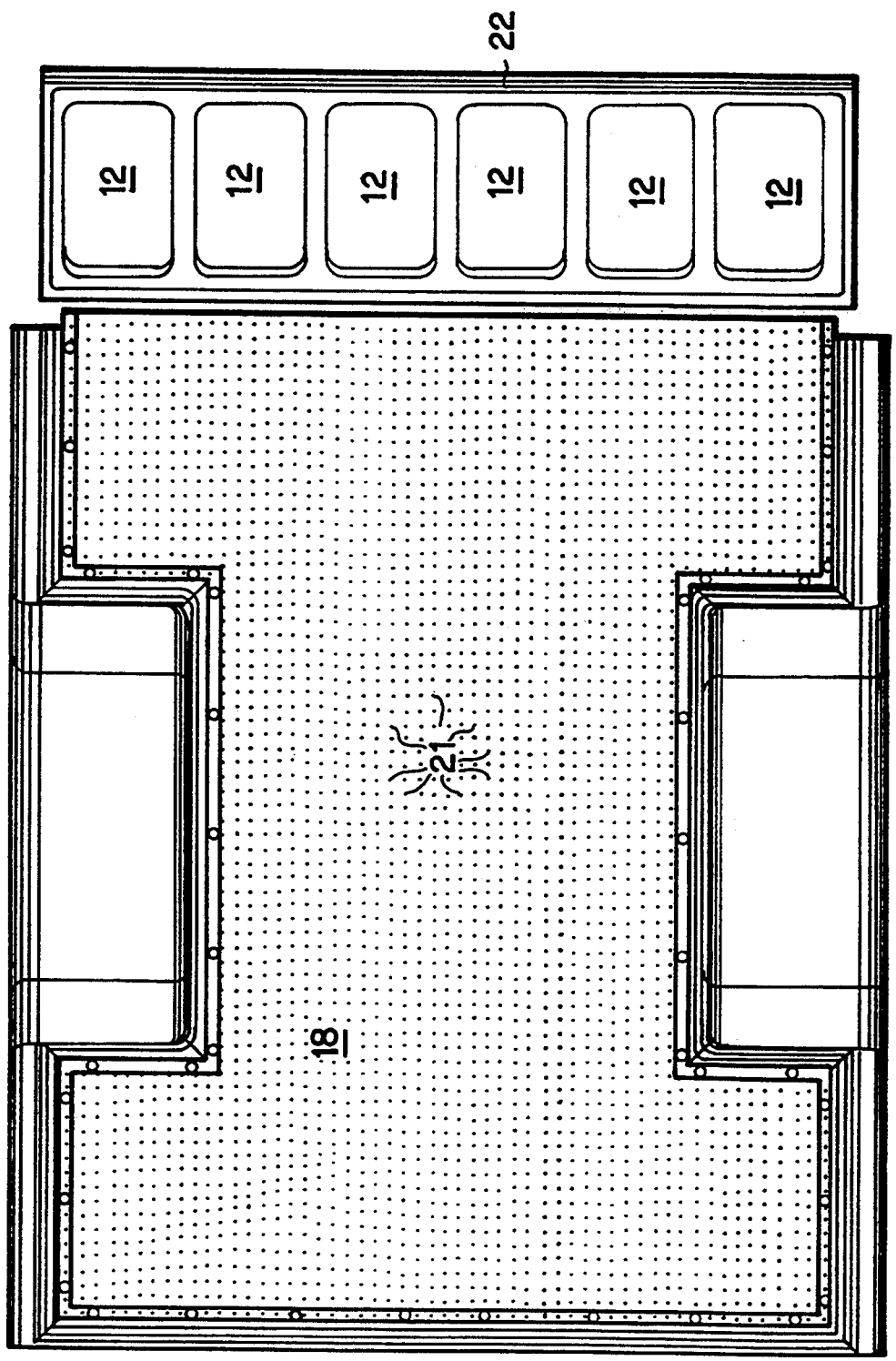
FIG. 3 is a bottom view of the dual composition bed liner and tailgate cover.
Figure 4:
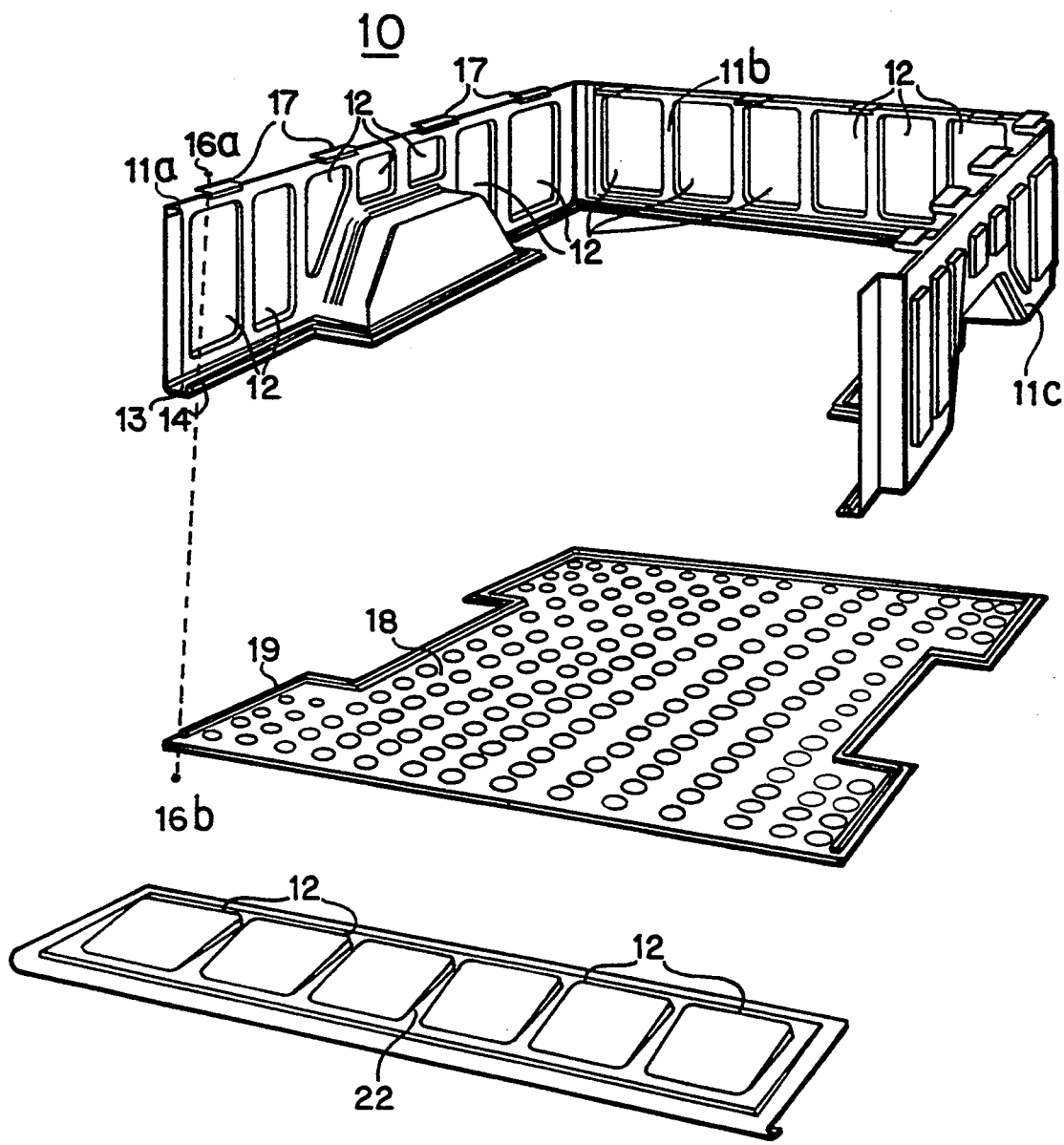
FIG. 4 is an exploded perspective view of the dual composition bed liner and tailgate cover.
Figure 5:
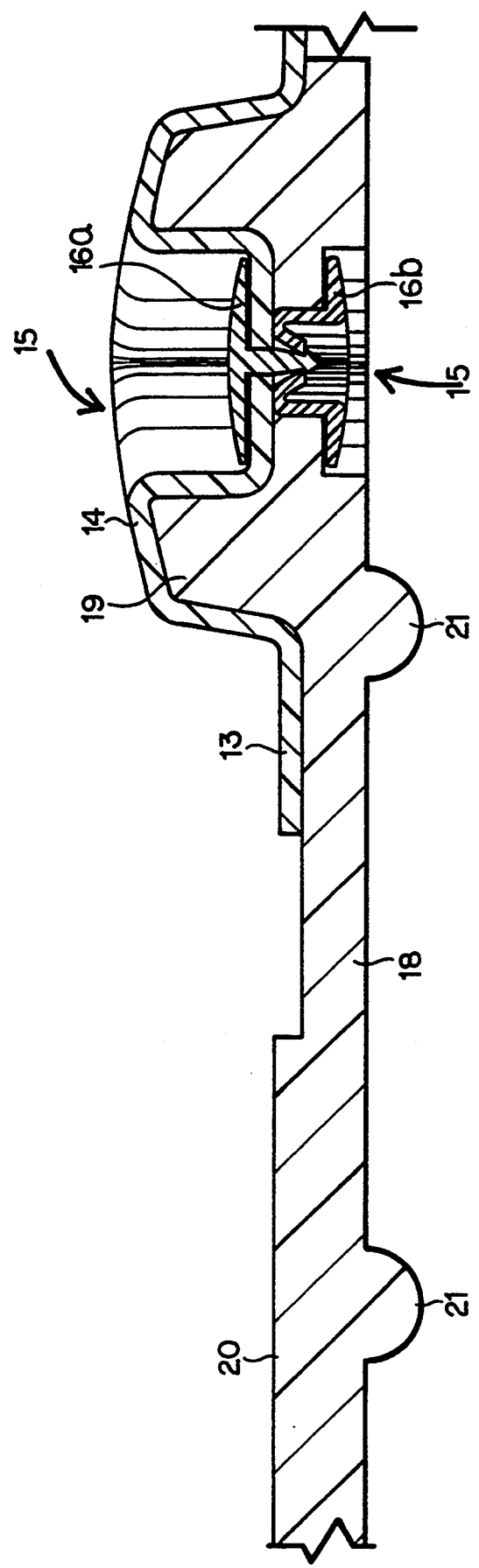
FIG. 5 is a partial cross section view showing the connection between the unitary wall member and the bed mat.
Figure 6:
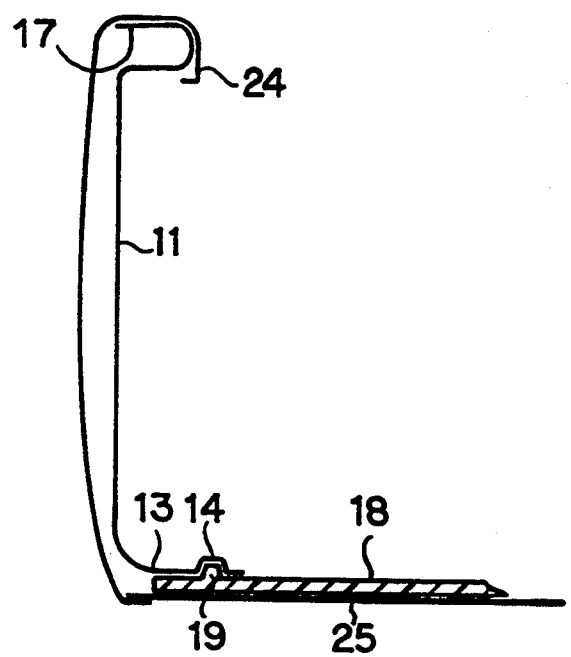
FIG. 6 is a partial sectional view showing how the liner fits under the pickup truck bed rail.

Referring now to the figures, a dual composition bed liner 10 is illustrated in detail. Dual composition bed liner 10 generally has a U-shaped unitary side and front wall member 11, which includes left sidewall 11a, front wall 11b and right sidewall 11c, to which a non-skid cushioning bed mat 18 is attached. Unitary wall member 11 has a lip or flange 13 extending inwardly from the bottom edges of left sidewall 11a, front wall 11b and right sidewall 11c. A downward facing channel, namely matt retaining ridge channel 14, is formed in the underside of bottom lip 13. Channel 14 runs continuously around the inside perimeter of unitary wall member 11. Rivet recesses 15 are periodically positioned in the upper surface along mat ridge channel 14 and sized to receive the male portion 16a of nylon rivet 16. Structural and cushioning formations 12, either protruding or recessed, are formed in the vertical portions of left sidewall 11a, front wall 11b and right sidewall 11c. These formations add structural rigidity to the side and front walls, and at the same time provide additional resiliency and shock absorption. unitary wall member 11 is advantageously manufactured from a polyethylene plastic or similar material using vacuum forming or other conventional molding techniques. A plurality of "C" shaped retaining tabs 17 are formed along the upper edge of unitary wall member 11. Each retaining tab 19 configured to engage the underside of truck bed rail 24, as is shown in detail in FIG. 6.

Bed mat 18 is constructed largely from a rubber-type material to provide both a high coefficient of friction and high shock absorption properties. Retaining ridge 19 is formed on the upper surface of bed mat 18 around its marginal edges. Retaining ridge 19 is configured to engage mat ridge channel 14 and consequently has rivet recesses 15 formed periodically along its upper edge to cooperate with rivet recesses 15 in mat ridge channel 14. Rivet recesses 15, in both mat ridge channel 14 and retaining ridge 19, have through holes axially positioned within the recesses to receive the male portion 16a of the nylon rivet 16. Additional rivet recesses 15 are formed on the underside of bed mat 18 so that the female portion 16b of nylon rivet 16 is counter sunk and will not come into contact with truck bed 25.

The upper surface of bed mat 18 has a plurality of friction pads 20 formed thereon to enhance the non-skid feature and to provide a means for water to drain beneath any cargo positioned on the mat. Additionally, the underside of bed mat 18 has a plurality of mat pads 21 formed thereon to enhance the cushioning effect of bed mat 18 and allow any water which might collect under the bed mat to drain.

Figure 7:
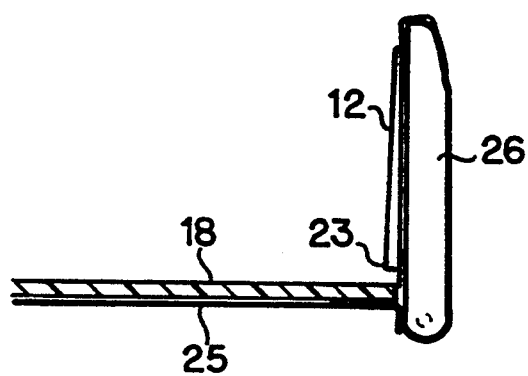
FIG. 7 is a partial sectional view showing how the tailgate cover overlaps the rear edge of the mat.

A tailgate cover 22 is provided and is formed of the same material as unitary wall member 11. Tailgate cover 22 is separately attached to truck tailgate 26 using a suitable attachment means, such as screws, rivets or the like. Tailgate cover 22 has a plurality of protruding cushioning and structural formations 12 formed thereon, similar to unitary wall member 11. Additionally, a bed mat retention lip 23 is formed to protrude along a bottom edge of tailgate cover 22. Retention lip 23 is positioned so that when tailgate 26 is in its closed upright position, retention lip 23 overlaps, in close proximity, the rear edge of bed mat 18. This overlapping feature prevents the rear edge of bed mat 18 from lifting and separating from truck bed 25 due to air turbulence. Advantageously, the formations 12 which are positioned on tail gate cover 22 are formed in the wedge shaped cross-section shown in FIG. 7 to aid in loading and unloading cargo.

While there is shown and described the present preferred embodiment of the invention, it is to be distinctly understood that this invention is not limited thereto but may be variously embodied to practice within the scope of the following claims.

I claim:

1. A pickup truck bed liner comprising:
    a unitary wall member having two side walls joined together by a front wall in a generally "U" shaped configuration;
    a flexible and resilient bed matt being positioned between the side walls and along a bottom edge of the unitary wall member; and
    attachment means for matingly interconnecting the bed matt to the bottom edge of the unitary wall member.

2. The pickup bed liner of claim 1 wherein the integral attachment means includes:
    a lip extending inwardly from the bottom edge of the unitary wall member, the lip having a downward facing channel formed therein extending around the inside perimeter of the unitary wall member; and
    a retaining ridge formed on an upper surface of the bed matt, the retaining ridge being in engagement with the channel and retained therein.

3. The pickup bed liner of claim 2 wherein the integral attachment means further comprises:
    rivet recesses being formed in an underside of the bed matt and aligned with the retaining ridge; and
    rivet attachment means being positioned within the rivet recesses and extending through the bed matt and the lip, the rivet recess being deep enough to countersink the rivet attachment means therein.

4. The bed liner of claim 3 further comprising a tail gate cover being positioned opposite the front wall and juxtaposition a back edge of the bed matt.

5. The bed liner of claim 2 further comprising a tail gate cover being positioned opposite the front wall and juxtaposition a back edge of the bed matt.

6. The bed liner of claim 1 further comprising a tail gate cover being positioned opposite the front wall and juxtaposition a back edge of the bed matt.

7. The bed liner of claim 6 wherein the tail gate cover has a retaining lip protruding therefrom being positioned to closely overlap the back edge of the bed matt when the tail gate cover is in an upright position.

8. The bed liner of claim 5 wherein the tail gate cover has a retaining lip protruding therefrom being positioned to closely overlap the back edge of the bed matt when the tail gate cover is in an upright position.

9. The bed liner of claim 4 wherein the tail gate cover has a retaining lip protruding therefrom being positioned to closely overlap the back edge of the bed matt when the tail gate cover is in an upright position.

* * * * *